Jan. 22, 1963    A. DUERKSEN    3,074,109
PRESS FOR PORTABLE TIRE RETREADING MOLDS
Filed Dec. 18, 1958    10 Sheets-Sheet 1
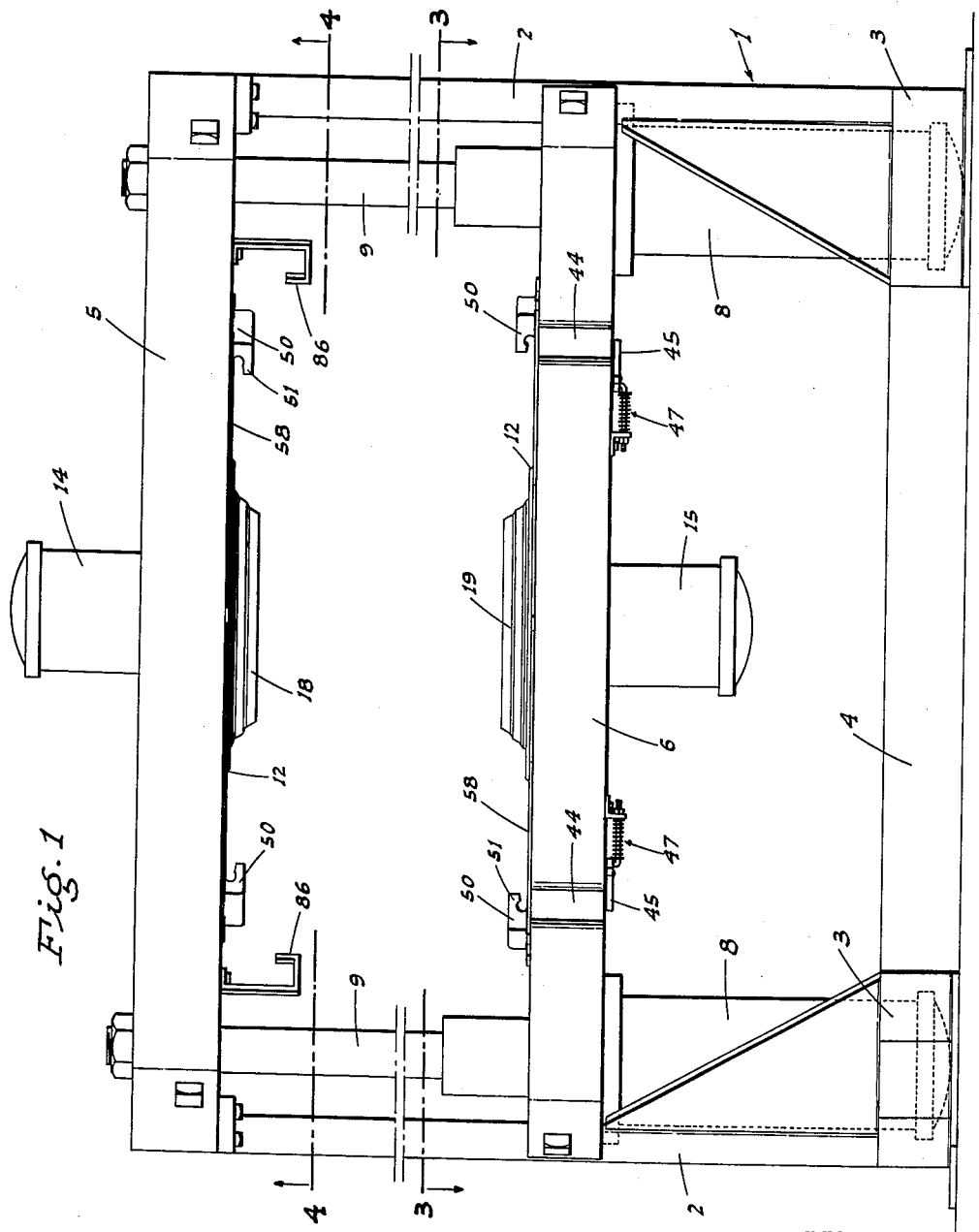
INVENTOR.
Arnold Duerksen
BY
ATTYS

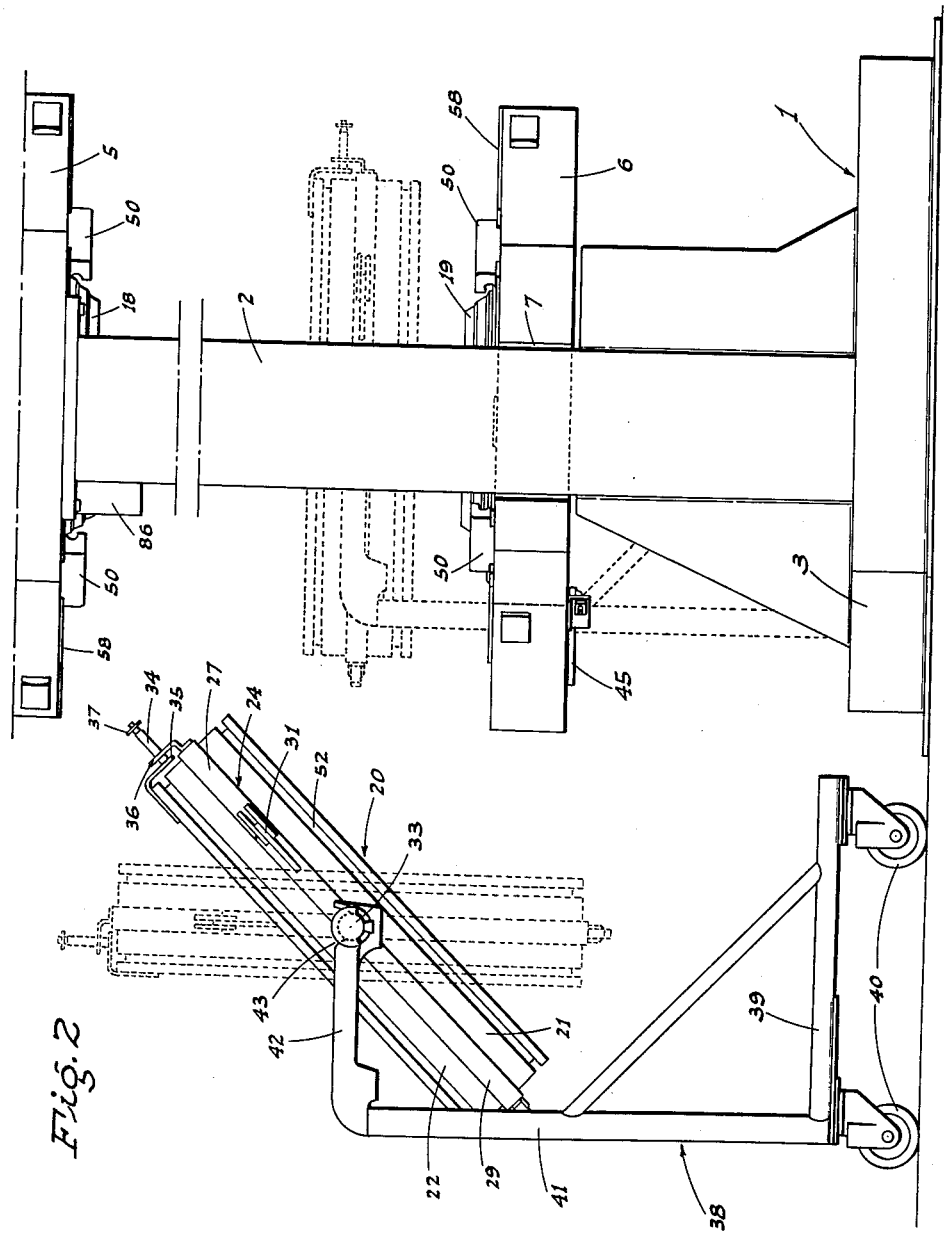

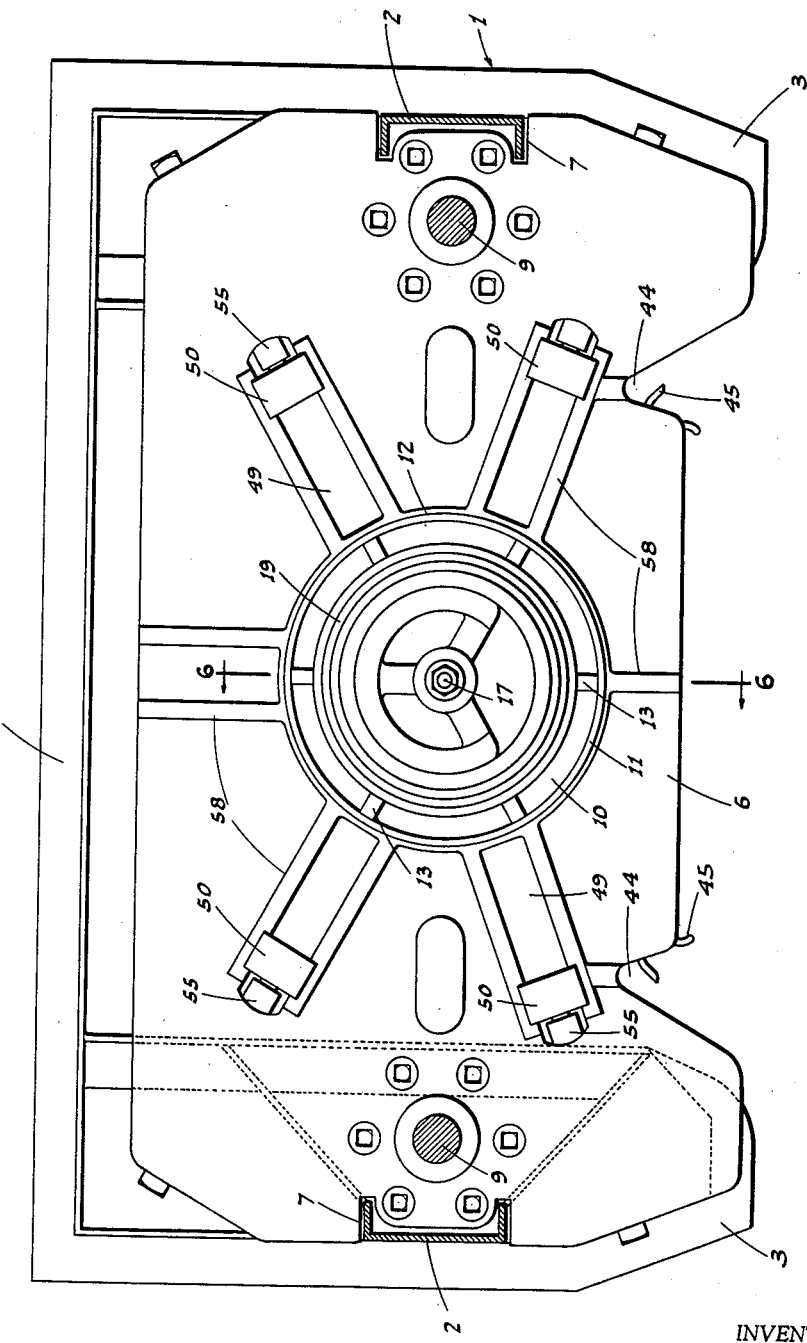

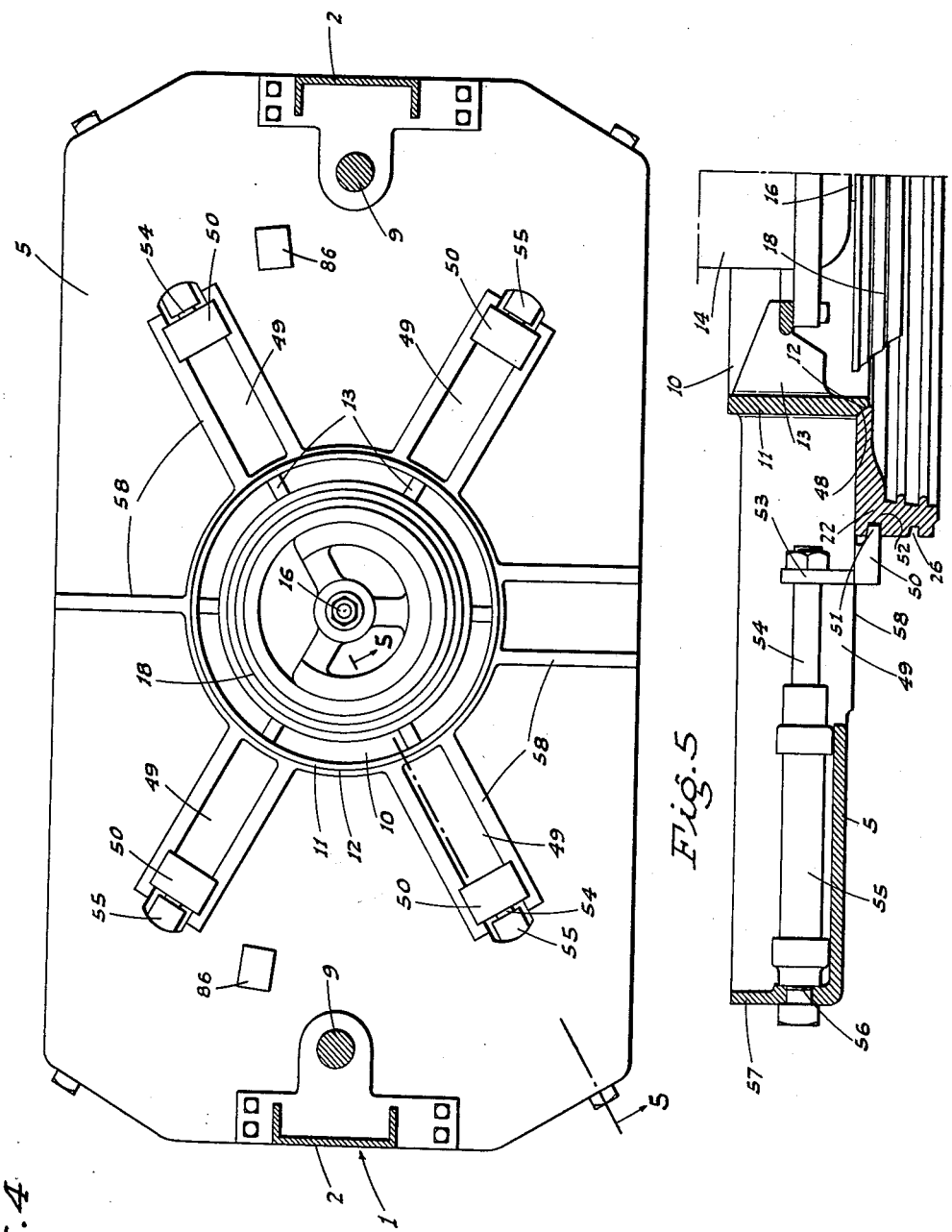

Jan. 22, 1963

A. DUERKSEN 3,074,109

PRESS FOR PORTABLE TIRE RETREADING MOLDS

Filed Dec. 18, 1958

INVENTOR.
Arnold Duerksen
BY
ATTYS

Jan. 22, 1963 A. DUERKSEN 3,074,109
PRESS FOR PORTABLE TIRE RETREADING MOLDS
Filed Dec. 18, 1958 10 Sheets-Sheet 6
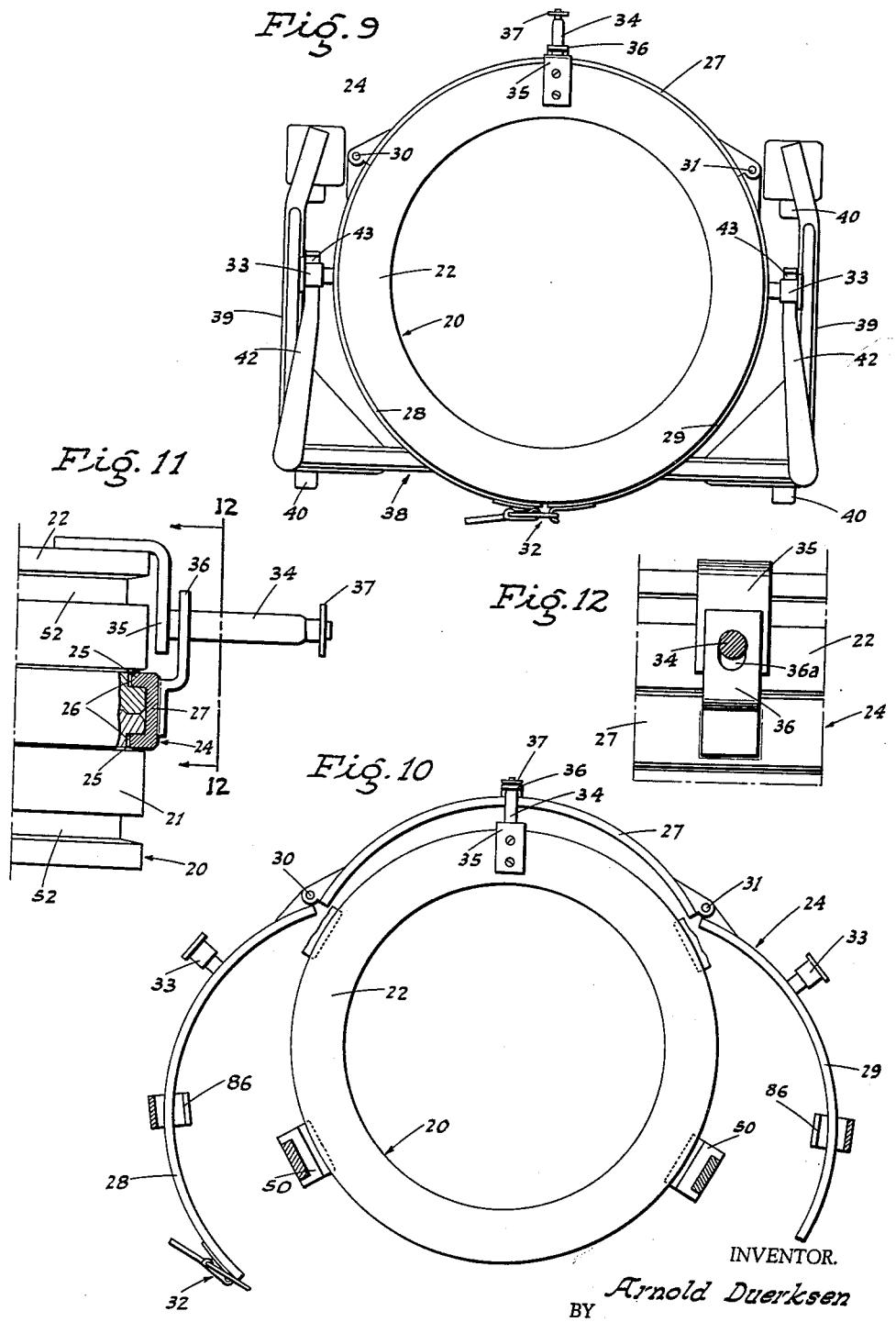
INVENTOR.
Arnold Duerksen
BY
ATTYS

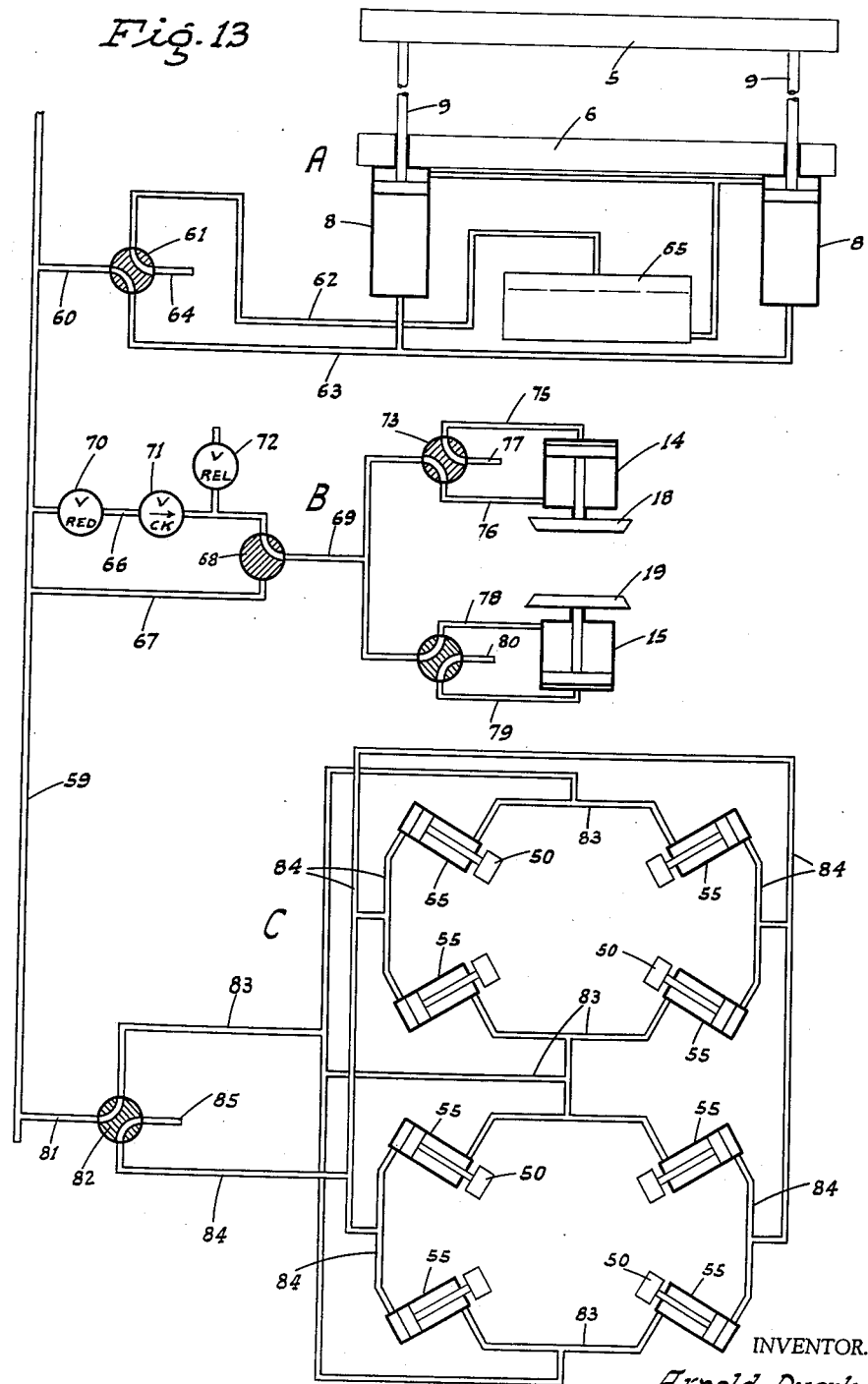

Jan. 22, 1963
A. DUERKSEN
3,074,109
PRESS FOR PORTABLE TIRE RETREADING MOLDS
Filed Dec. 18, 1958
10 Sheets-Sheet 8
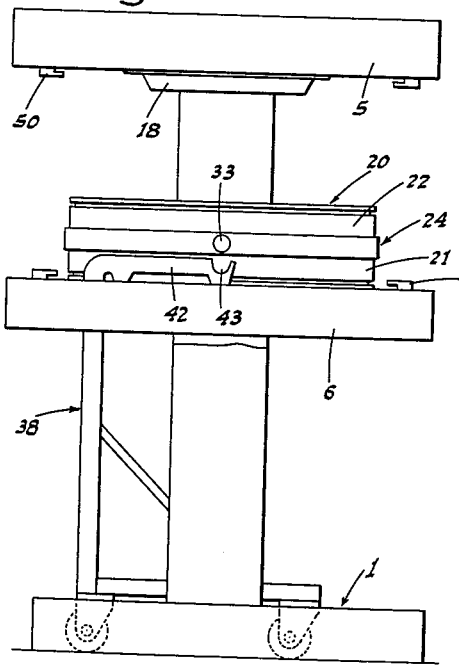
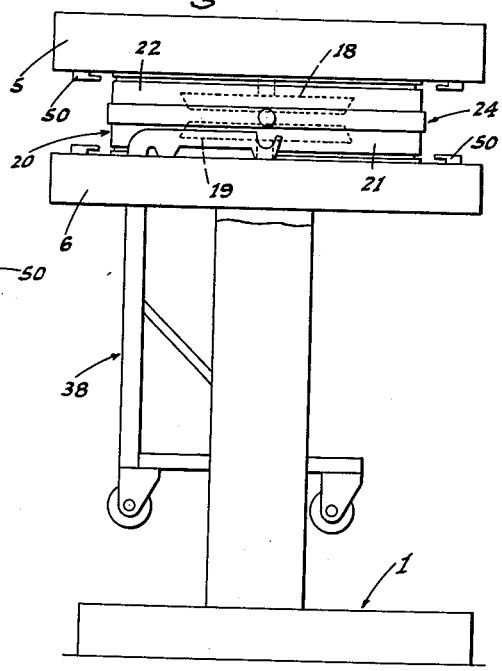
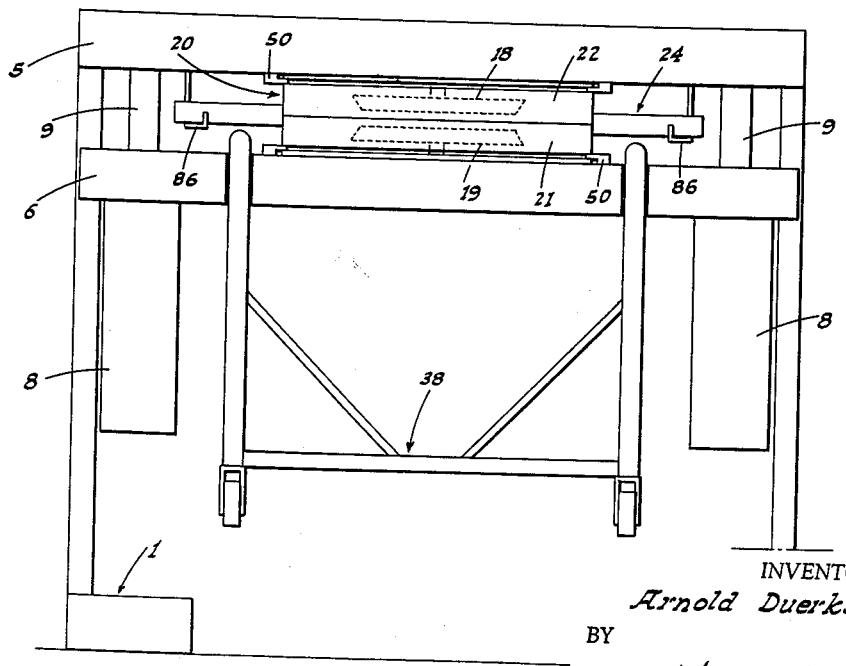
INVENTOR.
Arnold Duerksen
BY
ATTYS INVENTOR.
Arnold Duerksen
BY
ATTYS

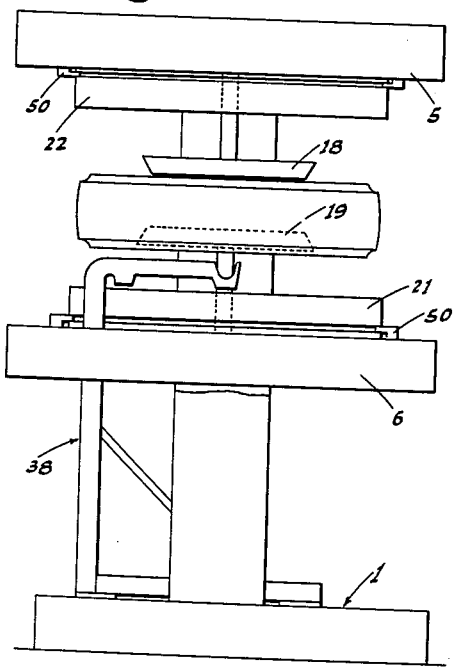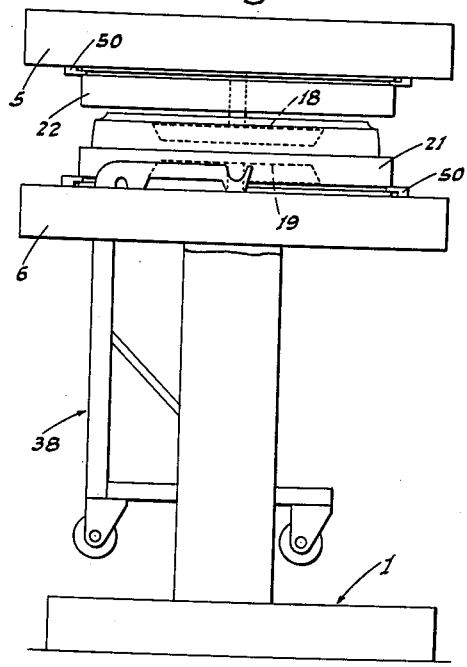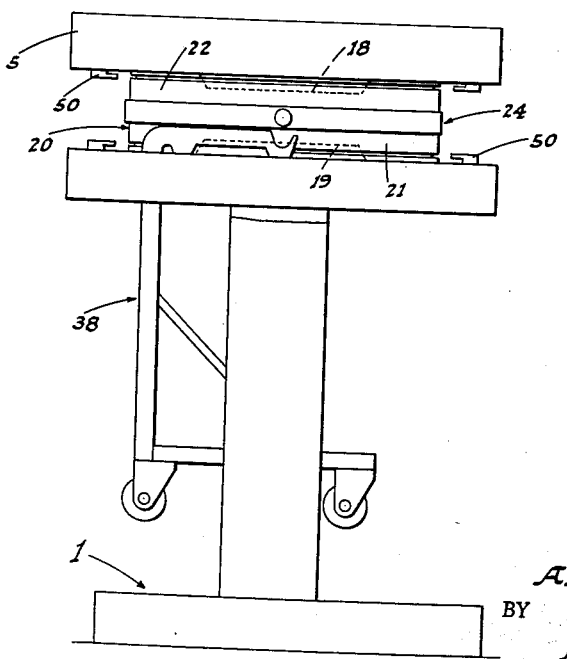

United States Patent Office 3,074,109
Patented Jan. 22, 1963

3,074,109
PRESS FOR PORTABLE TIRE RETREADING MOLDS
Arnold Duerksen, Lodi, Calif., assignor to Super Mold Corporation of California, Lodi, Calif., a corporation of California
Filed Dec. 18, 1958, Ser. No. 781,303
4 Claims. (Cl. 18—18)

This invention is directed to, and it is a major object to provide, a novel apparatus—in the nature of a press, and hereinafter so identified—which is adapted for the reception, opening, and closing of a portable, full-circle or band-type tire retreading mold which includes annular body-half or matrix sections which together—in normal matching engagement—define an endless tire receiving cavity; the primary purpose of the press being to mechanically open and close the mold—by axially separating and then re-engaging the matrix sections. When the mold is thus opened, a tire previously vulcanized in the mold may be removed therefrom and then another tire which has been prepared for new tread vulcanization may be placed in the mold, and the matrix sections then closed about such latter named tire.

Another object of the invention is to provide a press, for the purpose described, which includes—in combination with facing relatively movable platens between which the mold is adapted to be disposed—novel means to releasably secure the corresponding matrix sections to the platens when the press is closed on the mold, so that when the press is next opened the matrix sections remain on and are moved apart with the platens, to thus also effect opening of said mold.

An additional object of the invention is to provide a press, as above, which includes—on the platens—novel tire bead engaging pressure ring units arranged to act on the tire beads in a manner to release and eject the vulcanized tire from the mold as it is opened by the press; to accomplish non-scuffing entry of the next and unvulcanized tire into the mold as it is closed; and to center the tread of said unvulcanized tire in the closed mold.

A further object of the invention is to provide a novel mold supporting dolly adapted to move the mold into, and out of, the press; the mold—as moved into the press—being lifted from the dolly when the press initially closes, and said dolly then being maintained in a predetermined position, by releasable engagement with one of the platens, so as to automatically receive and re-support the mold, for withdrawal from the press, after final opening of the later.

A still further object of the invention is to provide a press, for the purpose described, wherein the several working parts are power actuated by fluid pressure power cylinders; all to the end that the press—in its cyclic operation—functions positively and smoothly.

It is also an object of the invention to provide a practical, reliable, and durable press for portable tire retreading molds, and a press by means of which molds of such type can be efficiently and rapidly unloaded and loaded.

These objects are accomplished by means of such structure and relative arrangement of parts as will fully appear by a perusal of the following specification and claims.

In the drawings:

FIG. 1 is a front elevation of the press, open and empty; the view being vertically foreshortened. The valve controlled, fluid pressure conduit system for the various power cylinders (in this and other views) has been omitted for the sake of simplicity of showing.

FIG. 2 is a fragmentary end elevation of the press, shown in connection with the mold supporting dolly moving into position to deposit a mold in the press.

FIG. 3 is a sectional plan taken on line 3—3 of FIG. 1.

FIG. 4 is a sectional plan taken on line 4—4 of FIG. 1.

FIG. 5 is a fragmentary enlarged sectional elevation taken on line 5—5 of FIG. 4, but showing a matrix section as engaged with the platen and secured in place.

FIG. 9 is a plan of the mold as horizontally supported by the dolly.

FIG. 10 is a plan of the mold as detached from the dolly, and with the clamping or locking ring released.

FIG. 11 is a fragmentary enlarged elevation of the mold, partly broken out and in section, showing particularly the locking ring and the locating and guide means associated therewith.

FIG. 12 is a fragmentary section on line 12—12 of FIG. 11.

FIG. 13 is a diagram of the valve controlled, fluid pressure conduit system for the power cylinders; the parts worked by the cylinders all being shown in their retracted positions.

FIGS. 14-22 inclusive are diagrams of the press showing certain steps in the cycle of operation; all of said views being end elevations with the exception of FIG. 16, which is a front elevation.

FIG. 14 shows the mold as deposited in the press (following the initial positioning as shown in dotted lines in FIG. 2), and with the mold lifted clear of the dolly but with the latter still supported on the floor.

Figure 6:
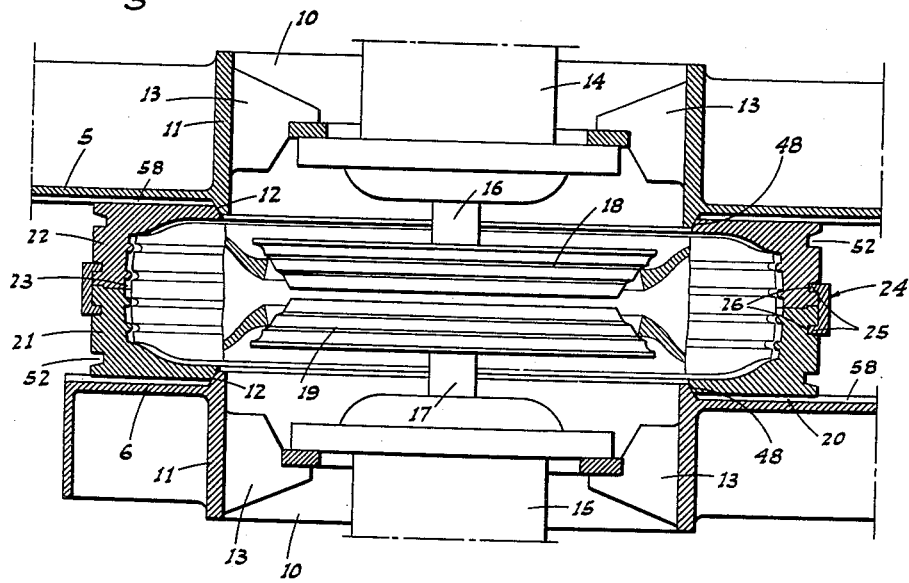
FIG. 6 is a fragmentary enlarged sectional elevation on line 6—6 of FIG. 3, but showing both platens with a tire containing mold therebetween, and with the tire engaged by the pressure rings and reduced in diameter to permit subsequent separation of the matrix halves from each other and from the tire. The locking ring is shown, however, as engaged and before its release from the matrix sections.
Figure 7:
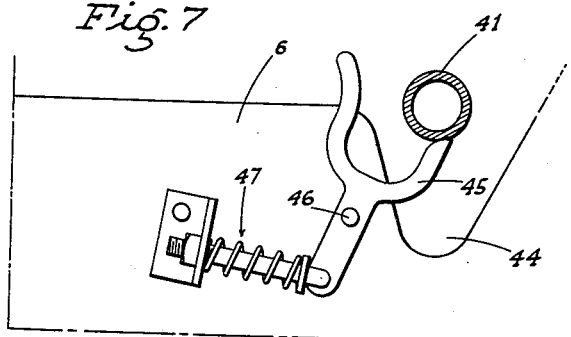
FIGS. 7 and 8 are detail views, looking up from below the lower platen and showing the dolly-leg latch in released and engaged positions, respectively.
Figure 8:
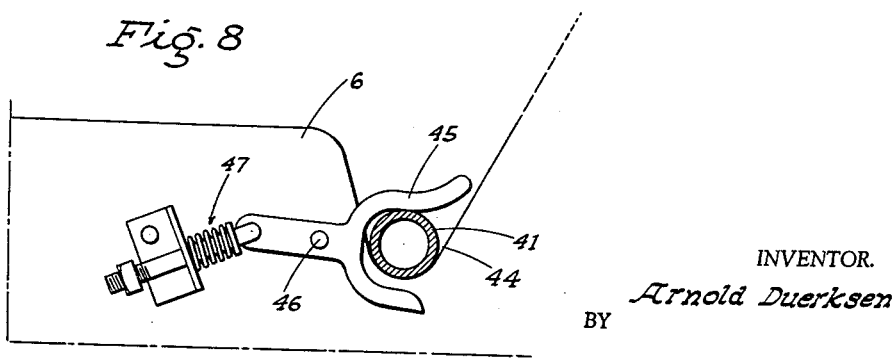

FIG. 15 shows the lower platen (and dolly) fully lifted to close the press with the mold engaged between the platens, and with the pressure rings advanced to engage the tire beads to reduce the diameter of the retread-vulcanized tire, as in FIG. 6; the locking ring remaining in place.

FIG. 16 is a similar view, but shows the locking ring as released, and with the securing dogs in engagement with the matrix sections.

Figure 17:
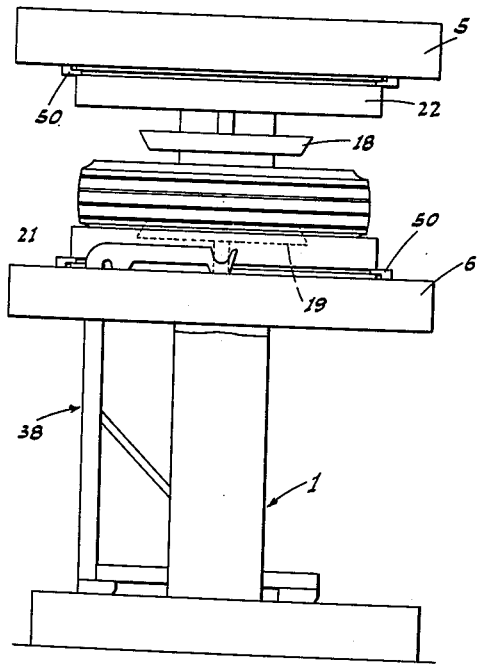

FIG. 17 shows the lower platen as substantially but not fully lowered, with the matrix sections separated and the tread-vulcanized tire exposed; the pressure rings being advanced.

Figure 18:
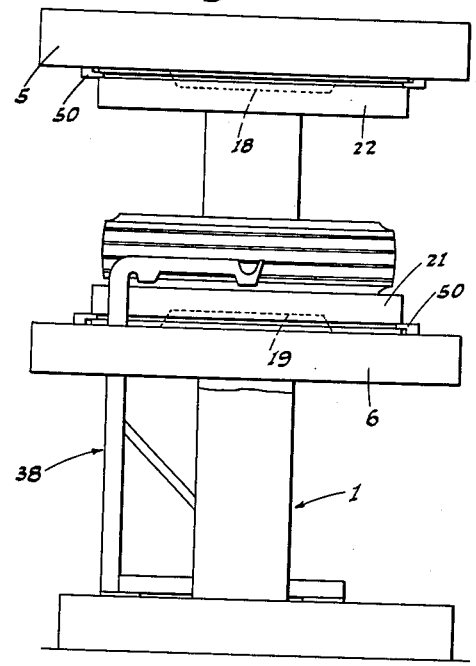

FIG. 18 shows the lower platen in its fully lowered position and the pressure rings retracted; the retread-vulcanized tire then being ready for removal.

Figure 19:
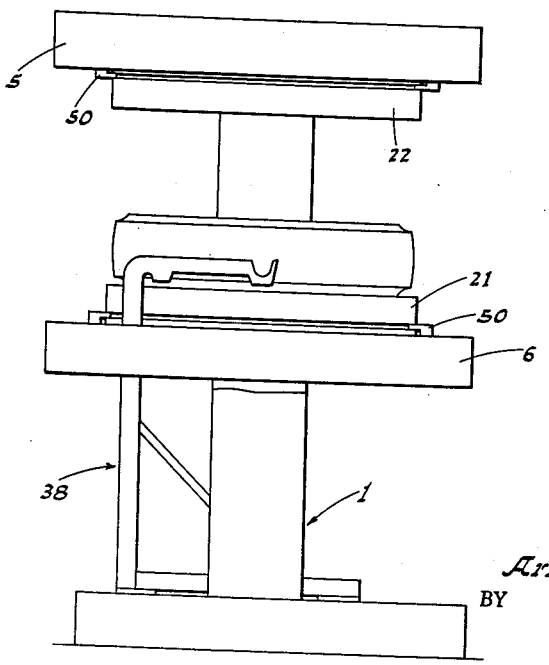

FIG. 19 shows the next tire to be vulcanized as disposed in the open press on the lower matrix section.

FIG. 20 shows the pressure rings as advanced, with said last named tire engaged and lifted by the lower pressure ring preparatory to closing of the mold by the press.

FIG. 21 shows the lower platen, and the lower matrix section thereon, as substantially but not fully raised; the pressure rings being in engagement with the tire to reduce its diameter preparatory to full closing of the press and mold, and complete entry of the tire into the latter.

FIG. 22 shows the press and mold fully closed, the locking ring re-engaged, and the securing dogs retracted from the matrix sections; all preparatory to opening of the press and removal of the mold therefrom by the dolly.

Referring now more particularly to the characters of reference marked thereon, the press comprises an upstanding, horizontally elongated frame, indicated generally at 1; such frame including end posts 2 which upstand from transverse end pedestals 3 intermediate the ends of the latter. The pedestals 3 are connected at the floor solely by a rear cross member 4, whereby the floor space ahead of said cross member and between the pedestals 3 is unobstructed from the front of the press.

A fixed, elongated upper platen 5 extends horizontally between, and is secured to the upper ends of, the posts 2, while a vertically movable lower platen 6 extends horizontally between said posts 2 below said upper platen 5; the lower platen 6 being notched, as at 7, to accommodate said end posts 2.

The lower platen 6 is movable between a lowered position, as in FIG. 1, and a raised position, as in FIG. 6, by means of power cylinders 8 fixed to and depending from the end portions of said platen 6; such power cylinders including upwardly projecting piston rods 9 which are fixedly secured to the upper platen 5. The cylinders 8, which travel with the lower platen 6, are double acting whereby when said cylinders are energized in one direction or the other the platen 6 is caused to raise or lower relative to the upper platen 5, whereby to close and open the press, respectively.

Centrally of the ends thereof, and intermediate the front and rear edges, each of the platens 5 and 6 is formed with a circular bore 10 which is peripherally defined by a vertical-axis collar 11; each such collar including an axially inwardly projecting end portion which extends beyond the working face of the related platen to provide an annular, exteriorly beveled, locating flange 12; such flanges 12 being in vertical alinement with each other.

Each vertical-axis collar 11 is fitted, on the inside, with a plurality of circumferentially spaced, radially inwardly projecting mounting webs 13 which support a vertical-axis power cylinder; the upper power cylinder being shown at 14, and the lower power cylinder at 15.

The piston rod 16 of the power cylinder 14 projects downwardly, while the piston rod 17 of the power cylinder 15 projects upwardly; the piston rods 16 and 17—which are axially alined—being fitted at their adjacent ends with tire bead engaging pressure rings, indicated at 18 and 19, respectively. The pressure rings 18 and 19, which are peripherally staged for engagement with tire beads of different diameter, are—when retracted—partially received, in concentric relation, within the confines of the related locating flanges 12.

The mold with which the press is adapted to be used is indicated generally at 20, and is of portable, full-circle or band type; such mold including—in normally matching engagement—endless, annular body-half or matrix sections 21 and 22, which together form a tire receiving cavity 23. This type of mold has circular side openings which expose the beads of a tire in said mold; the tire containing an inside curing bag backed by an inside curing rim, neither of which are shown but both of which are conventional.

The matchingly engaged matrix sections 21 and 22 are normally secured together in unitary relation by a full-circle locking ring, indicated generally at 24; such locking ring surrounding the mold centrally and in lapping relation to the engaged inner edges of said matrix sections 21 and 22. The locking ring 24 is of inwardly opening channel form, with the flanges 25 engaging in peripheral grooves 26 in the related matrix sections. The locking ring 24 is three-part, and comprises—by reference to the mold when horizontal—a rear segment 27 and forward segments 28 and 29; the segments 28 and 29 being hinged at their rear ends to the adjacent ends of the rear segment 27, as at 30 and 31. At their opposite or front ends the segments 28 and 29 are normally connected together by a releasable catch 32. When the catch 32 is engaged, with the locking ring 24 surrounding the mold with the flanges 25 in the peripheral grooves 26 of the matrix sections, the latter are locked against axial separation; i.e., the mold is closed, as when a tire is being tread-vulcanized therein.

The locking ring 24 is provided, at opposed points in the circumference thereof, and on the forward segments 28 and 29, with laterally outwardly projecting side trunnions 33, whose purpose will hereinafter appear.

When the catch 32 is released, and the locking ring disengaged from the matrix sections 21 and 22 by spreading the forward segments 28 and 29 and shifting them rearwardly with the rear segment 27, as in FIG. 10, it is desired to then maintain such ring, at the rear, in a predetermined located position relative to the matrix section 22 for easy and guided re-engagement of said ring with the matrix sections in the manner and for the purpose as will hereinafter appear. This is accomplished by providing the matrix section 22, which is uppermost when the mold is disposed horizontally in the press, with a radially outwardly projecting rear stud 34 carried on an inturned bracket 35 fixed to said matrix section 22. The rear segment 27 of locking ring 24 is provided, at the rear, with an outturned upstanding bracket 36 which laps but lies outside of the bracket 35; said bracket 36 having a bore 36a through which the stud 34 slidably projects in loose-play relation lengthwise of said bracket 36. At its outer end the stud 34 is provided with a stop 37.

The above described locking ring locating and guiding assembly, including the stud 34, together with the brackets 35 and 36, is the subject of U.S. Patent No. 2,916,772.

The mold 20, when out of the press, is supported by a dolly, indicated generally at 38, such dolly including a horizontal bottom frame 39 fitted with casters 40. Legs 41 upstand from the rear corners of the bottom frame 39, and at their upper ends said legs are fitted with forwardly projecting horizontal arms 42 which generally overhang the opposite sides of the bottom frame 39 but are only approximately half the length thereof. At their front ends the arms 42 are formed with cradles 43 which receive the opposed, side trunnions 33 on the locking ring 24. In this manner the mold 20 is effectively supported by the dolly, and for ready movement from place to place. The mold 20—which is either steam or electrically heated, and to which the heating medium is fed by detachable couplings (not shown)—occupies a vertical position on the dolly 38 when a tire is being retread-vulcanized in said mold, and which is accomplished at a point a distance from the press. When the mold 20 is vertically supported in the dolly 38, the catch 32 is lowermost, while the stud 34 is uppermost.

After retread-vulcanization of a tire in the mold 20 is completed, such mold is transported on the dolly 38 to a position in front of the press; the mold then being swung forwardly and downwardly at the top to a horizontal position. Thereafter the dolly 38 is advanced until the mold 20 occupies a centralized position in the press, and which is initially open; the mold then being disposed a distance above the lower platen (see FIG. 2).

When the mold 20 is so advanced into the press, the legs 41 of the dolly 38 enter vertical notches 44 in the front of said lower platen 6, and such legs are releasably latched in said notches by means of snap-action or over-dead-center latch forks 45 pivoted on the under side of platen 6, as at 46, and which forks are spring-urged by an assembly indicated at 47. As each leg 41 enters the corresponding notch 44, the latch fork 45 straddles such leg and is swung inward thereby until the fork passes dead-center and the snap action occurs. In this manner both legs 41 are effectively but releasably retained in the notches 44. When the legs 41 are so engaged in said notches 44 the then horizontal mold 20 is substantially in axial alinement between the annular locating flanges 12.

Upon closing of the press in the cyclic operation thereof, as hereinafter described, and when the lower platen 6 is moved upwardly, said lower platen first engages and lifts the mold 20 out of the cradles 43 of the dolly arms 42, and thereafter said platen 6 engages such dolly arms 42 so that the entire dolly is lifted with said platen, yet with the trunnions 33 clear of said cradles 43.

When the press is fully closed, the annular locating flanges 12—which are exteriorly beveled—matchingly engage in the side openings of the mold, as at 48, whereby to mechanically center said mold in the press and relative to the tire bead engaging pressure rings 18 and 19 which are adapted to work through such side openings and to engage the adjacent and exposed beads of a tire in said mold.

In order to releasably secure the matrix sections 21 and 22 to the adjacent platens, as necessary to the accomplishment of opening and closing the mold, as will hereinafter appear, the following arrangement is provided:

The upper platen 5 and lower platen 6 are each formed with a plurality of circumferentially spaced, radial slots 49, along each of which a securing dog 50 is slidable; each such securing dog 50 being formed with a radially inwardly projecting lip 51 adapted to engage in a peripheral groove 52 in the adjacent matrix section when seated against the related platen. Each securing dog 50 includes an attachment finger 53 which extends some distance into the corresponding slot 49; such finger, at its inner end portion, being fixed to the piston rod 54 of a double acting, radially outwardly extending power cylinder 55 disposed within the confines of the related platen, and which cylinder is connected at its outer end, as at 56, to the adjacent side wall 57 of said platen.

Each of the platens 5 and 6 is provided, on the inner or working surface, with a plurality of ribs 58 which radiate from the corresponding collar 11 in circumferentially spaced relation; certain of such ribs bordering the slots 49 and providing guides for the securing dogs 50. Such ribs serve the general purpose of engaging the adjacent matrix sections of the mold when the press is closed and said matrix sections are secured to the platen.

The valve controlled, fluid pressure system, which is employed to operate the power cylinders 8, 14 and 15, and 55—all of which power cylinders are double acting—is illustrated diagrammatically in FIG. 13, and includes the following:

Relatively high pressure air is supplied through a main conduit 59 from a suitable source (not shown). Such air pressure supply conduit 59 feeds three sections of the system—a first section for the power cylinders 8, a second section for the power cylinders 14 and 15, and a third section for the power cylinders 55; said sections being indicated generally at A, B, and C, respectively.

The section A comprises a feed line 60 connected between the air supply conduit 59 and a four-way valve 61 arranged to establish communication between feed line 60 and conduits 62 and 63, selectively, while opening the other of said conduits to a vent 64. The conduits 62 and 63, which are suitably branched, lead to communication with power cylinders 8 at the top and bottom, respectively. By manipulation of the four-way valve 61 the power cylinders 8 can be reversibly actuated, whereby to raise or lower the platen 6 to close or open the press.

The conduit 62 has an oil reservoir 65 interposed therein in a manner to maintain a non-compressible fluid head in the power cylinders 8 when the same are actuated to raise the platen 6; the pistons of said power cylinders 8 being initially in a top position in said cylinders; i.e., when the platen 6 is lowered.

The section B comprises a pair of feed lines 66 and 67 which lead in parallel from the air supply conduit 59 to a three-way valve 68 operative to connect, selectively, either of said feed lines 66 or 67 with a branched conduit 69. There is interposed in the feed line 66 a reduction valve 70 and a check valve 71; said feed line 66 also being connected to a pressure relief valve 72.

The feed line 66—as so arranged, and including the reduction valve 70—delivers a lower pressure to the valve 68 than does the feed line 67; the latter carrying the full pressure from conduit 59. The purpose of the feed lines 66 and 67, arranged as above, is to permit a lower or a higher pressure to be fed to the branched conduit 69 by valve 68 as working conditions may require.

Branches of the conduit 69 deliver air pressure to four-way valves 73 and 74 corresponding to the power cylinders 14 and 15. The four-way valve 73 is arranged to establish communication, selectively, between conduits 75 and 76 leading to opposite ends of the power cylinder 14, while opening the other of said conduits to a vent 77. The four-way valve 74 bears like relationship to conduits 78 and 79 leading to opposite ends of the power cylinder 15, and a vent 80.

With the above arrangement of section B the valve 68 is employed to feed either full or reduced air pressure to the valves 73 and 74, and said latter valves are operative in turn to selectively and reversibly cause actuation of the power cylinders 14 and 15 to advance or retract, as desired, the pressure rings 18 and 19 corresponding to said cylinders 14 and 15.

The section C comprises a feed line 81 connected between the air supply conduit 59, and a four-way valve 82 arranged to establish communication between branched conduits 83 and 84, selectively, while opening the other of said conduits to a vent 85; the branches of the conduit 83 leading to the inner ends of the power cylinders 55, while the branches of the conduit 84 lead to the outer ends of said cylinders. By manipulation of the four-way valve 82, the power cylinders 55 can be caused to simultaneously advance, or retract, the securing dogs 50.

The several valves of the fluid pressure system, as above, may be manually or automatically controlled during each cyclic operation of the press, and when reference is made hereinafter to the valve controlled actions of the power cylinders 8, 14 and 15, and 55, it will be understood—without need of further reference to said system—the manner in which said actions are caused to occur.

In use of the described press, to unload a retread-vulcanized tire from the mold 20, and to load the next tire for vulcanization thereinto, the press is initially in open position as in FIG. 1. Firstly, the conventional inside curing bag (not shown) in the retread-vulcanized tire is deflated and thereafter, as previously described, the mold 20 is run into the press by means of the dolly 38; the dolly legs 41 being releasably engaged in the notches 44, and the mold being supported horizontally in a plane above the lower platen 6.

The lower platen 6 is then run upwardly by the power cylinders 8; such platen 6 first picking up the mold thereon and lifting it so that the trunnions 33 rise out of the cradles 43 (see FIG. 14), and nextly such platen 6 picks up the arms 42 so that the dolly 8 is lifted off the floor and rises with said platen 6 to the closed position of the press (see FIG. 15), and at which time the mold is engaged between the platens 5 and 6; said mold being effectively centered by the locating flanges 12.

The operator, standing in front of the press, then releases the catch 32 of locking ring 24, spreads apart the forward segments 28 thereof, and pushes rearwardly to disengage the rear segment 27; such rear segment riding rearwardly on the stud 34.

After this has been accomplished the spread-apart forward segments 28 are placed in hook-type hangers 86 which depend from opposite end portions of the upper platen 5 (see FIG. 16). The released ring is thus effectively supported in a convenient and properly horizontally disposed plane for subsequent and guided reengagement with the matrix sections.

Upon release of the locking ring 24, as above, the securing dogs 50, which are initially retracted, are all simultaneously advanced by the power cylinders 55, with the result that such dogs 50 engage in the grooves 52 of the related matrix sections 21 and 22, positively securing the same to the corresponding platen.

Upon engagement of the mold 20 in the closed press, and release of the locking ring 24, the pressure rings 18 and 19 have been advanced by the power cylinders 14 and 15—normally actuated by the low pressure side of section B—into engagement with the beads of the retread-vulcanized tire in the mold; the advanced position of the pressure rings 18 and 19 being shown in dotted lines in FIGS. 15 and 16.

When the pressure rings are so advanced they urge the tire beads toward each other so as to effectively reduce the diameter of the tire and to minimize sticking thereof in the matrix sections 21 and 22 when the mold is opened by the press. Such opening of the mold is accomplished by lowering the platen 6 by the power cylinders 8, and as such platent lowers, said matrix sections 21 and 22 are axially separated; the pressure ring 18 pushing the tire downwardly out of the upper matrix section 22, while the lower pressure ring 19 pushes the tire upwardly out of the lower matrix section 21; FIG. 17 illustrating the tire as being pushed upwardly out of the lower matrix section 21 by the pressure ring 19.

If desired, and after the initial opening movement of the press and the mold, the lower pressure ring 19 may be retracted somewhat and the upper pressure ring 18 may be more forcefully advanced by employing the high pressure side of section B; this to further assure of positive ejection of the tire from the matrix section 22. Thereafter, during continued opening of the press and the mold, the upper pressure ring 18 may be retracted and the lower pressure ring 19 advanced by high pressure to further assure of positive ejection of the tire from the lower matrix section 21.

Nextly, and when the press and mold are fully open, with the matrix sections 21 and 22 separated as widely as possible, the pressure rings 18 and 19 are retracted, as in FIG. 18, which leaves the tire seating freely on said lower matrix section 21.

The tire is then manually removed from the press, and the next tire to be retread-vulcanized is placed in substantially centered relation on said lower matrix section 21 (see FIG. 19).

Thereafter, the pressure rings 18 and 19 are again advanced, as in FIG. 20, so that the lower pressure ring 19 picks up said next tire to be retread-vulanized and lifts it clear of the lower matrix section 21.

Following this, the lower platen 6 is moved upwardly by the power cylinders 8, whereupon both pressure rings 18 and 19 engage the beads of the tire and urge them towards each other before the press is fully closed (see FIG. 21); this to initially center the tire in the mold and to reduce the diameter of said tire before the mold completely closes with the matrix sections 21 and 22 in full surrounding relation to the tire. With the tire so reduced in diameter, it enters the mold without scuffing.

After the mold is completely closed by the press and about said next tire to be retread-vulcanized, the locking ring 24 is re-engaged (see FIG. 22). To do so the operator grasps the forward segments 28 and 29 of the locking ring, lifting them out of the hangers 86, and then pulling forwardly, which results in the rear segment 27—by virtue of its guiding on the stud 34—re-engaging in the peripheral grooves 26 of both matrix sections. Thereafter, the forward segments 28 and 29 are swung inwardly and likewise re-engaged in the grooves 26, whereupon the catch 32 is recoupled, completing the locking of ring 24 about said matrix sections 21 and 22.

After the mold is closed and the locking ring is re-engaged, but before opening of the press, the conventional curing bag (not shown) in the tire is inflated; the pressure rings 18 and 19 remaining advanced until such inflation is accomplished. By reason of such advanced pressure rings engaging the tire beads during inflation of the tire, the latter is effectively held centered in the mold cavity and cannot skew therein.

Finally, after retracting the pressure plates 18 and 19 from the tire and the securing dogs 50 from the matrix sections (again see FIG. 22), the press is opened by lowering the platen 6 by the power cylinders 8; the closed mold moving downward with said platen. When this occurs the dolly 38 first re-seats on the floor, and the arms 42 move relatively outwardly from said platen 6, so that the side trunnions 33 automatically re-engage in the cradles 43. This actually occurs slightly before the lower platen 6 reaches its lowermost position, so that in said latter positions of platen 6, the mold 20 is again suspended thereabove by the dolly arms 42.

The dolly 38 is then drawn rearwardly to clear the mold from the press, and at which time the dolly legs 41 escape the notches 44; the snap-action latch forks 45 being swung outwardly to their initial or starting position.

The dolly is then employed to transport the mold, with the tire therein to be retread-vulcanized, to the station at which said operation is accomplished; the mold being turned back to vertical in the dolly 38 preparatory to engagement of the heating medium couplings (not shown).

With the described press, as used in association with the mold supporting dolly, portable tire retreading molds of the type described can be readily and positively opened for unloading of a retread-vulcanized tire, loading of the next tire to be retread-vulcanized, and then closed and withdrawn from the press for transport to the vulcanizing station.

In additiron to the convenience of opening and closing the mold, which the press accomplishes, the feature of having the dolly remain in a predetermined position in connection and movable with the lower platen during the entire cycle of operations is of great advantage, as such dolly is always maintained in proper position to receive the closed mold for removal from the open press after the tire unloading and loading operations are completed.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. In combination with a press operable for the purpose described and which press includes an upper platen and a lower platen, the lower platen being movable vertically toward the upper platen: a dolly separate from the press, such dolly comprising a transportable base, and vertical supports on the base, tire mold supporting means on the vertical supports, such latter means being effective through movement of the dolly to selectively project a supported mold into a position between the platens or to withdraw a mold from a position between the platens, the mold supporting means including substantially horizontal arms projecting outwardly from the vertical supports and being adapted to overlie the lower platen upon advance of the dolly toward the press, cradles formed on the outer ends of the arms, which cradles are adapted to receive trunnions projecting diametrically from the outer circumference of the mold, the height of the arms relative to the base being such that when the mold is projected between the platens it will lie in a horizontal plane spaced vertically from the horizontal plane of the lower platen, vertical movement of the lower platen being then effective to engage the mold and lift it vertically away from the supporting arms.

2. A combination as in claim 1 including cooperating means between the dolly and the lower platen, operative when the dolly is moved to project the mold into position between the platens, to releasably enagage the dolly with the lower platen for vertical movement therewith after the lower platen has engaged the mold and lifted it vertically away from the supporting arms.

3. A combination as in claim 2 in which the engaging means functions to releasably maintain the dolly against lateral movement away from the platen.

4. A combination as in claim 3 in which the releasable engaging means comprises notches formed in the edge of the lower platen, the vertical supports of the dolly moving into said notches as the mold is projected between the platens, and releasable snap action catches on the lower platen effective to engage and hold said vertical supports as the latter move into said notches.

References Cited in the file of this patent

UNITED STATES PATENTS

| | | |
|---|---|---|
| 1,406,433 | Atcheson | Feb. 14, 1922 |
| 1,798,826 | Wieghardt | Mar. 31, 1931 |
| 2,509,830 | MacMillan | May 30, 1950 |
| 2,543,292 | Kany | Feb. 27, 1951 |
| 2,622,275 | Dodge | Dec. 23, 1952 |
| 2,734,225 | Glynn | Feb. 14, 1956 |
| 2,826,783 | Robbins | Mar. 18, 1958 |
| 2,851,726 | Ericksen | Sept. 16, 1958 |
| 2,903,742 | Barefoot | Sept. 15, 1959 |

FOREIGN PATENTS

| | | |
|---|---|---|
| 1,136,039 | France | May 7, 1957 |